Aug. 9, 1960 N. EDERER 2,948,850
APPARATUS FOR ANALYZING WEIGHT COMPOSITION OF MATERIALS
Filed Feb. 10, 1958
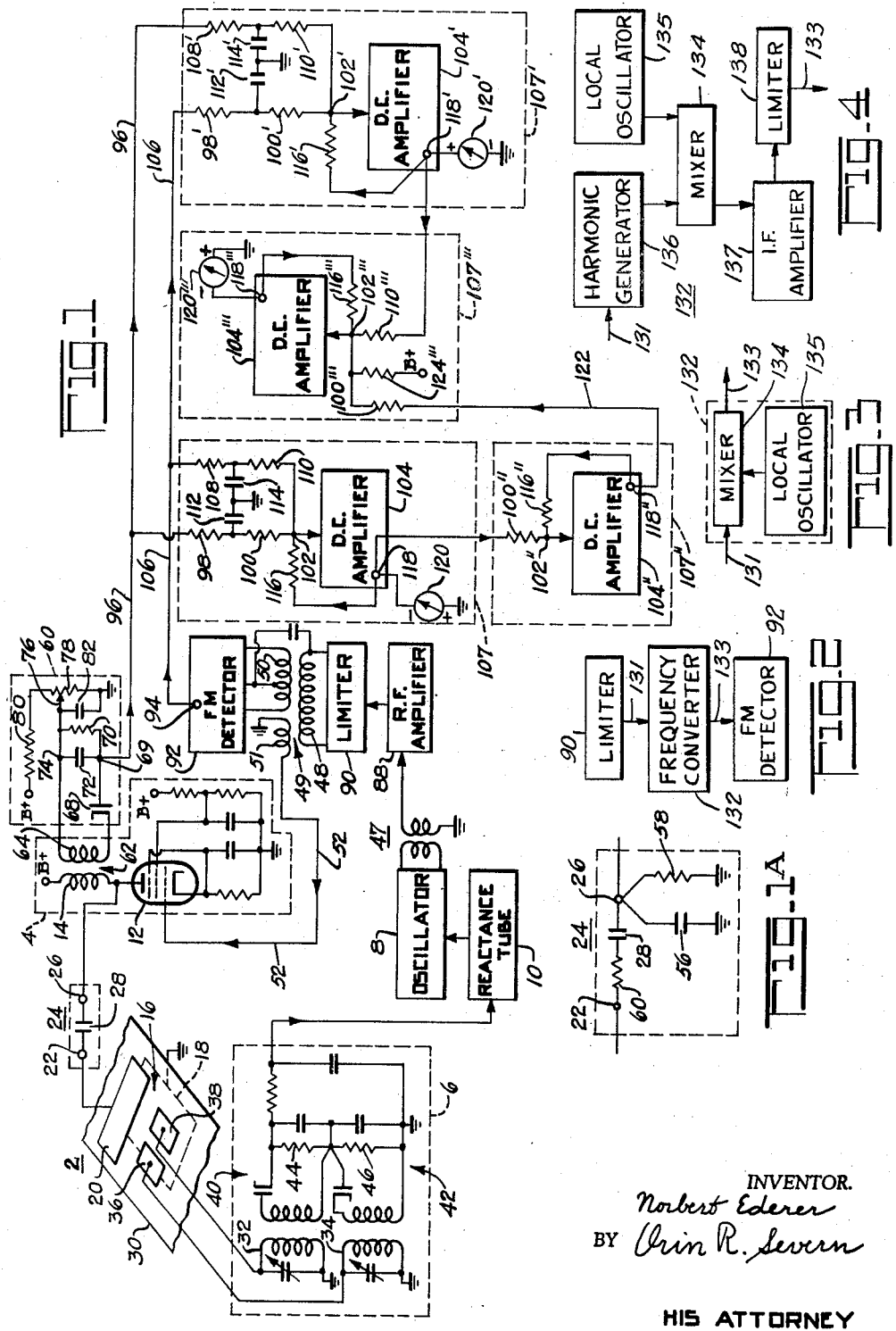
INVENTOR.
Norbert Ederer
BY Orin R. Severn
HIS ATTORNEY United States Patent Office 2,948,850
Patented Aug. 9, 1960

2,948,850

APPARATUS FOR ANALYZING WEIGHT COMPOSITION OF MATERIALS

Norbert Ederer, Fairlawn, N.J., assignor to Curtiss-Wright Corporation, a corporation of Delaware Filed Feb. 10, 1958, Ser. No. 714,173

14 Claims. (Cl. 324—61)

This invention relates to electrical apparatus for analyzing production materials as to the weight of their ingredients, and more particularly to the measurement of the moisture weight of materials produced by continuous process in strip form, such as cloth, paper, plastics, etc., as well as of the weight of the pure or dry material as distinguished from and apart from the moisture weight therein.

Apparatus of the afore-described character is known in the art, examples being the U.S. Patent 1,708,073 granted to A. Allen on April 9, 1929, and the British Patent 591,172 bearing a date of acceptance of the complete specification of August 8, 1947. The devices of the prior art employ an electrical translating element that is responsive to deviation in moisture weight from a predetermined reference standard, and is included in circuitry which provides an accordingly variable electrical signal. Commonly the translating element is a condenser between whose plates the material strip is caused to pass. With changes in moisture weight there occur changes in the capacitance or in the dielectric losses (i.e. in the effective resistance) of the condenser, and these changes are reflected as suitable signal changes, e.g. changes in current or voltage, to actuate an indicator.

The major limitation of the prior art devices resides in the fact that the condenser responds also to changes in weight of the dry material, as regards both its capacitance and effective resistance. Thus it is possible that the moisture weight changes in one direction while the weight of the dry material simultaneously changes in the opposite direction to such an extent as to reflect erroneously no change in moisture weight. This limitation has been recognized heretofore, but few if any satisfactory compensatory schemes of conventional type have been proposed, chiefly because no devices capable of measuring the weight of solely the dry material are known. In other words, the devices for measuring the weight of the material in fact measure the weight of the total material including that of the moisture therein, rather than that of the pure or dry material, rendering the conventional compensation techniques inapplicable, also because of the very absence of any devices for measuring solely the moisture weight it has not been feasible to compensate in conventional fashion the material weight measuring devices so as to render these devices reflective of the weight of solely the dry or pure material.

Recently a scheme for overcoming the problems of the prior art has been proposed. According to this scheme the material is subjected to measurement by two devices each jointly and severally responsive to moisture and the pure material weight. More particulary the first device includes a condenser of the above mentioned type, and the second device includes a source of radiation and a radiation detector disposed in proximity to the material strip. The responses of the two devices represent in effect a pair of simultaneous equations in the two unknown variables of moisture weight and dry material weight and these two equations are solved for the two variables by suitable circuit means. The chief disadvantage of this scheme resides in the requirement of two measuring devices which are physically spaced apart and therefore of necessity cannot subject to measurement the same portion of the material simultaneously. Accordingly it is possible that the portion instantly subjected to measurement by one device may have moisture weight or dry material weight or both differing from that of the portion simultaneously subjected to measurement by the other device, leading to new errors.

It is a principal object of the present invention to provide moisture measurement apparatus and also apparatus for the measurement of the pure or dry material weight, which is accurate and reliable and moreover employs but a single primary translating element for subjecting the material strip to measurement.

This and other objects are attained according to the invention and in the preferred manner again by resort to the condenser as the measuring device with the material strip passing between its plates. With changes in moisture weight and also in the weight of the dry material the capacitance and also the effective resistance of the condenser are both varied. The capacitor is connected in an oscillation circuit. The changes in the capacitance cause changes principally in the oscillation frequency, i.e. frequency modulation, in accordance with changes of the two variables. The resistance changes superimpose on the frequency modulated wave simultaneously an amplitude modulation also in accordance with the two variables. The amplitude modulation and also the frequency modulation are detected and each represents a joint response to moisture weight and to weight of the pure or dry material. The two variables are extracted by means for solving a pair of simultaneous equations for the two variables.

The invention will be more fully set forth in the following description referring to the accompanying drawing, and the features of novelty will be pointed out with particularity in the claims annexed to and forming a part of this specification.

In the drawing, Fig. 1 is a schematic drawing of the measurement apparatus according to a preferred embodiment of the invention; Fig. 1a is a modification of the circuitry within the block 24 of Fig. 1 suitable to improve the linearity of the amplitude and frequency modulation; Fig. 2 is a block diagram of circuitry that may be integrated in the circuitry of Fig. 1 for increasing the relative change in system operating frequency resulting from change in moisture weight or dry material weight with respect to the system operating frequency corresponding to standard moisture and standard dry material weights, in other words circuitry for increasing the F.M. sensitivity of the system; and Figs. 3 and 4 are block diagrams of respective embodiments of the frequency converter 132 of Fig. 2.

The apparatus illustrated in Fig. 1 employs circuitry disclosed in the aforesaid British Patent 591,172 and organized in part in the same manner. This circuitry includes the measuring capacitor and associated circuitry generally indicated as at 2, a radio frequency amplifier 4, a discriminator 6, an oscillator 8 and a reactance tube modulator 10. The structure and operation of these units may be summarized briefly as follows: The R.F. amplifier 4 includes a pentode 12 whose plate load is a parallel resonant circuit, which includes as the tuning frequency determinative elements an inductance 14 and the measuring condenser 16. The condenser is provided with a lower grounded plate 18 and an upper plate 20, the latter being connected to a terminal 22 of a network indicated as at 24, thence from the opposite end terminal 26 of the network 24 to the plate of the pentode 12. The network 24 in the simplest form shown is a capacitor 28 which in turn in the simplest form is merely a D.C. blocking condenser, of a value large compared to the value of the measuring capacitor 16, so that the inductance 14 and capacitance 16 principally determine the tuned frequency of the amplifier 4. The material whose moisture weight is to be measured is a di-electric material produced by continuous process in the form of a strip 30 which passes between the plates 18 and 20 in spaced relation thereto. The material may be paper, cloth, plastics or any other di-electric production material.

The capacitance value of the condenser 16 is determined in part by the air between the plates 18 and 20 and in part by the ingredients of the material 30 in the given portion passing between these plates at any instance. For convenience in terminology the total material and its weight will be regarded as composed of the pure or dry material and its weight, and of the moisture and the moisture weight therein. In the case of paper which will be discussed hereinafter as exemplary, the total paper or pulp will be considered as composed of fiber (corresponding to pure or dry material) and moisture.

The capacitor 16 is a means sensing the weight of the fiber and also the weight of the moisture of a representative unit area or portion of the strip 30 passing between the plates 18 and 20. Thus with a change in fiber weight per unit area from a predetermined standard fiber weight, the effective di-electric constant of the capacitor 16 will be changed; more specifically in the case of thicker paper the effective di-electric constant is increased and therefore the capacitance value of the measuring condenser 16 is increased, lowering the resonant frequency of the tank circuit; the converse is true for the case of thinner paper. Also the capacitor senses changes in moisture of the representative unit area from a pre-determined standard. The terms moisture, moisture weight or moisture content in the proper context will be used hereinafter to connote weight of the moisture contained in the representative unit area. Also the term weight will be used hereinafter as connoting the weight of the representative unit area. With changes in moisture the capacitance of the condenser 16 is likewise changed, specifically with an increase in moisture its effective di-electric constant is also increased and in fact more greatly so than in the case of a like increase in fiber weight, resulting in an even greater increase in capacitance and therefore an even greater decrease in the resonant frequency of the tank circuit.

In practice the paper strip 30 may experience separate changes in moisture or in fiber weight or concurrent changes therein, and it is possible that the moisture may change in one direction whereas the fiber weight changes in the opposite direction so that the resonant frequency remains the same as though paper of standard fiber weight and standard moisture were sensed by the capacitor.

With a change in fiber weight, again assuming an increase for example, the di-electric losses in the fiber are increased, lowering the Q of the tank circuit and reducing the amplification of the amplifier 4; the converse is true in the case of decrease in fiber weight. Also a change in moisture, again assuming an increase for example, increases the dielectric losses and in fact more greatly so than a like change in fiber weight, and as explained in the aforesaid British patent the amplitude variations due to moisture changes are relatively of much larger magnitude than the simultaneous changes in the resonant frequency induced thereby.

As previously explained, the present invention is based on the principle of separate extraction of the amplitude modulation and frequency modulation induced by changes in moisture weight and fiber weight separately or concurrently, and accordingly it is within the scope of the invention to operate the unit 4 not as an amplifier but as an oscillator producing a sinusoidal signal variable simultaneously in amplitude and frequency, each in accordance with the moisture and fiber weights. However for improved sensitivity, as explained in the British patent, and in the present invention also for other purposes hereinafter specified, the unit 4 is operated as a tuned amplifier and the frequency of the oscillator 8 is adjusted to lock in on the instant resonant frequency of the amplifier. If the oscillator were to operate at fixed frequency the sense of the amplitude deviation of the amplifier 4 would be ambiguous, since increases as well as decreases in moisture or fiber weight from standard would effect decrease in the R.F. voltage developed across the tank circuit.

Accordingly the oscillator 8 is operated such that its frequency is the same as the instant resonant frequency of the tank circuit. This is accomplished by an automatic frequency control system which includes the discriminator 6, and the reactance tube modulator 10. The discriminator includes a pair of tuned circuits 32 and 34, the resonant frequencies of which are determined in part by condenser plates 36 and 38 respectively. These plates are disposed between the main plates 18 and 20 and more specifically between the strip 30 and the plate 20 in spaced relation thereto. Thus the plate 36 and the plate 18 constitute an auxiliary condenser which is also sensitive to changes in moisture and fiber weight and as such variably determines the parallel resonant frequency of the tuned circuit 32. The plate 38 cooperates analogously with the plate 18 to provide an auxiliary condenser which is variably determinative of the tuned frequency of the parallel resonant circuit 34. The auxiliary condensers are coupled electrostatically to the main measuring condenser and as such have impressed thereacross voltages at a frequency the same as the operating frequency of the amplifier 4. Assuming that paper of standard fiber weight and standard moisture weight is initially passed through the measuring condenser 16, the two tuned circuits 32 and 34 are tuned to resonance substantially equally above and below the resonant frequency of the amplifier 4, so as to apply voltages of equal amplitude to the diode detectors 40 and 42 which are transformer coupled to the circuits 32 and 34 respectively. The detector circuit 40 is arranged for rectification of the positive peaks whereas the detector circuitry 42 is arranged for the rectification of the negative peaks of the impressed voltages. The rectified D.C. voltages are developed across the resistors 44 and 46 respectively which are connected in series with one another, the lower end of resistor 46 being grounded. The voltage at the upper end of the resistor 44 with respect to ground is then the summation of the two rectified voltages and since these two voltages are equal and opposite under the assumed conditions the summed voltage is zero.

Whenever the resonant frequency of the amplifier changes due to change in moisture weight or fiber weight or both, the two circuits 32 and 34 are both detuned with reference to their resonant frequencies had under standard conditions. Assuming for example that the resonant frequency of circuit 32 was initially above the resonant frequency of the tuned amplifier 4, whereas that of the tuned circuit 34 was initially therebelow, an increase in moisture or fiber weight results in an increase in the capacitance values of the auxiliary condensers. Assuming that the operating frequency of the amplifier 4 has not as yet changed, the resonant frequency of the circuit 32 will be closer to such operating frequency and the resonant frequency of the circuit 34 will be farther away from such operating frequency. As a consequence the rectified voltage across resistor 44 is increased whereas the rectified voltage across the resistor 46 is decreased resulting in a net positive rectified control voltage. This control voltage is applied to the reactance tube 10 which accordingly alters the oscillator frequency of the oscillator 8 in such a direction as to effect change of such operating frequency towards the frequency to which the amplifier 4 is tuned. The output of the oscillator is fed ultimately to the grid of the pentode 12. It will be apparent that the change in operating frequency of the oscillator 8 and therefore that of the amplifier 4 will continue until the operating frequency is the same as the resonant frequency of the tank circuit, whence the control voltage again assumes a value of zero.

It is true, of course, that the capacitance changes in the main and auxiliary condensers are accompanied by resistance changes, but these are substantially self-cancelling as regards the operation of the A.F.C. system. Thus in the example discussed in the preceding paragraph, the increase in thickness reduces the amplitude of the tank circuit voltage, initially because of both the capacitance and resistance changes, and ultimately upon lock-in substantially solely because of the resistance change. This results in reduction of the voltages impressed across the auxiliary condensers; these voltages are decreased further owing to the resistance changes in the auxiliary condensers. Because of the like sense of voltage changes due to resistance changes as contradistinguished from the opposite sense of voltage changes due to capacitance changes of the auxiliary condensers, the effects of such resistance changes are inherently cancelled.

The apparatus so far described provides a high sensitivity in amplitude modulation as explained in the aforesaid British patent; a further advantage over simply an oscillator in place of the amplifier-discriminator reactance tube-oscillator-amplifier system is in the improved linearity of both the amplitude modulation and frequency modulation with changes in moisture and in fiber weight changes. As is well-known, oscillators are inherently self-stabilizing and therefore not too well-suited for direct amplitude modulation, and although amplitude modulated oscillators are known in the art, these require availability of an independent source of modulation voltage, not available here. As regards frequency modulation, it is known that heavy resistive loading of an oscillator alters its operating frequency in accordance with variations in such resistive loading. If an oscillator were employed without amplifier, it would have to supply in addition to its own power including possibly grid driving power, also the losses in the measuring condenser, and the power absorbed by the A.M. and the F.M. detectors, thereby disturbing linearity of the frequency modulation.

Linearity of the amplitude modulation and also the frequency modulation is desirable because of the relative ease of electronic solution of a pair of linear simultaneous equations, i.e. of the first degree. Of necessity the solution would become more complex were these equations non-linear.

It is within the scope of the invention to couple the oscillator voltage directly to the amplifier 4 as is the case in the aforesaid British patent. At the same time the well-known ratio detector may be employed for F.M. detection; because of its good insensitivity to A.M. such ratio detector may be coupled either to the amplifier 4 or the oscillator 8. The former alternative arrangement is in the interest of minimizing oscillator loading and maintaining F.M. linearity as previously explained. The advantage of the latter alternative arrangement is due to the fact that the oscillator is inherently amplitude self-stabilizing as pointed out above, so that its A.M. is relatively small; consequently the dynamic range of the signal applied to the ratio detector is relatively small, and the ratio detector is almost absolutely insensitive to the residual oscillator A.M.

However, further to the end of improving the A.M. linearity, in accordance with the most preferred embodiment of the invention the oscillator output is amplitude limited prior to injection to the amplifier 4. This assures that the A.M. at the output of amplifier is due solely to the variations in the effective resistance of the condenser 16 and not also in part to the oscillator 8. Moreover, since this arrangement requires a limiter, the F.M. detector is energized by such limiter and insensitivity to system A.M. is assured. The amplifier 4 is operated Class A and its exciting signal is maintained at low amplitude to avoid grid current.

To the ends mentioned in the immediately preceding paragraph, the oscillator 8 is coupled by means of an output transformer 47 to an R.F. amplifier 88. The transformer 47 is preferably a step-down transformer with untuned secondary in the interest of minimizing loading of the oscillator 8 and in the further interest of avoiding introduction of additional A.M. The amplifier 88 may be substantially the same as the amplifier 4 except of course that an ordinary tuning condenser is employed therein in place of the measuring condenser 16. Further its tank circuit is shunted by a damping resistor to render the response of the amplifier 88 broad band. The amplifier 88 is operated Class A without drawing grid current further to minimize loading of the oscillator 8. The amplifier 88 feeds a one stage or two stage limiter 90, which may for example assume the forms as shown at pages 1149 and 1150 of "Radiotron Designer's Handbook" by F. Langford-Smith, fourth edition, 1952, distributed by the Radio Corporation of America. The limiter 90 removes amplitude modulation due to the oscillator 8 and the amplifier 88. On its output side the limiter 90 is connected to the primary 48 of discriminator transformer 49, which is provided with the usual center-tapped discriminator secondary 50, which in turn is connected to the input side of the F.M. detector 92 proper. The transformer 49 is provided with a further untuned secondary 51 which is connected over line 52 to the grid of the pentode 12 for excitation of the pentode 12. Constancy of the voltage across the secondary 51 is maintained by selecting said secondary 51 as a step-down winding, and by avoidance of tuning thereof. Linearity of the amplifier 4 is assured by selection of the secondary 51 so as to render the amplifier 4 operative as Class A without drawing grid current.

For small dynamic variations in moisture and fiber weight about the standard the circuitry so far described will inherently provide substantially linear amplitude modulation and a linear frequency modulation responses. Where a large dynamic range is contemplated, linearity in the frequency modulation is obtained at the expense of reduced sensitivity by selecting the capacitor 28 to be of comparable magnitude to that of measuring condenser 16. Circuitry for further improvement in the linearity of the modulations is illustrated in Fig. 1a. The frequency modulation linearity is further improved by addition of a capacitor 56 connected from the terminal 26 to ground as shown in Fig. 1a. The capacitor 56 also has a value comparable to that of condenser 16. To improve the linearity in amplitude modulation, as also shown in Fig. 1a, the capacitor 56 may be shunted by a resistor of a magnitude comparable to that of the effective parallel resistance presented as seen to the left of the terminal 22, and for a still further improvement in the linearity of amplitude modulation a small resistor 60, of a magnitude comparable to the effective series resistance of condenser 16, is inserted between the terminals 22 and 26 in series with capacitor 28. These modifications are at the expense of reduced sensitivity, which is acceptable for large dynamic variations.

The apparatus employs an A.M. detector 60 as is also the case in the aforesaid British patent. However according to the present invention the detector and its manner of coupling differ from that of the British patent. The inductance 14 constitutes the primary of a transformer 62 and coupling to the detector is by way of the secondary 64 thereof. Again in the interest of minimizing loading on the amplifier, the transformer 62 is a step-down transformer. The detector 60 as such is a conventional peak detector but rectifies the negative peaks. The lower end of the secondary 64 is connected to the cathode of a diode 68, whose anode is connected to an output terminal 69 and through the usual diode load resistor 70 and charging capacitor 72 to the upper end of the transformer. The resistor 70 and capacitor 72 are returned not to ground, but to a positive bias potential obtained at the slider 76 of a potentiometer 78 which is grounded at its lower end and is connected to the B+ voltage from its upper end through a resistor 80. The slider 76 is adjusted during the initial calibration of the apparatus so that when paper of standard fiber weight and standard moisture weight is fed through the measuring condenser 16 the output voltage at the junction 69 is zero volts with respect to ground.

It will be recalled that with an increase in moisture or in fiber weight the amplitude of the R.F. voltage at the plate of the pentode 12 decreases and accordingly the negative rectified voltage across the resistor 70 will also decrease in magnitude. In such case the positive bias at the slider 76 will exceed in magnitude the negative rectified voltage so that the voltage $V_{AM}$ available at the junction 59 may be represented as (1) $$V_{AM} = k_1 m + k_2 f$$

where $m$ is now the deviation in moisture weight from the standard moisture, $f$ is the deviation in fiber weight from standard fiber weight, and $k_1$ and $k_2$ are constants of proportionality relating the changes in the output voltage $V_{AM}$ to the changes in moisture and fiber weight respectively, and moreover are inherently positive in view of the discussion in the immediately preceding sentence.

The F.M. detector 92 may be of any conventional type, preferably in the interest of high sensitivity and wideband linearity of the Foster-Seeley or phase discriminator type indicated in Fig. 1 and more fully shown at page 1090 of the aforesaid Langford-Smith text. The limiter 90 and the discriminator 92 are tuned to a center frequency, also referred to as nominal system operating frequency, which corresponds to paper of standard fiber and moisture content, in which case the rectified voltage obtained at the output terminal 94 of the discriminator 92 is zero volts with respect to ground.

The suggested discriminator arrangement illustrated at page 1090 of the Langford-Smith text produces positive and negative output voltages with respect to ground with positive and negative deviations from center frequency respectively, as shown at page 1092 of the same text. It will be recalled that with an increase in moisture of fiber weight the system operating frequency decreases, i.e. deviates negatively from center frequency. Accordingly the rectified output voltage at the output terminal 94 may be represented as (2) $$V_{FM} = -k_3 m - k_4 f$$

where the new symbols $k_3$ and $k_4$ represent respectively the constants of proportionality relating the change in $V_{FM}$ to moisture change and fiber weight change respectively, and are again inherently positive. Thus with an increase above standard of moisture or fiber weight or both the voltage $V_{AM}$ available at the terminal 69 is inherently positive whereas the voltage available at the terminal 94 is inherently negative. The reason for the negative rectification in the A.M. detector 60 is now apparent; this coupled with the positive bias at the slider 76 results in a characteristic of positive slope in the sense that an increase in moisture or fiber weight above standard results in a positive voltage at the terminal 69 whereas the response at the terminal 94 is of negative slope so that the same increase will result in a negative voltage at the terminal 94. The fact of responses of opposite slope permits additive rather than subtractive solution of the simultaneous equation. Of course the relations of the responses could be inverted; this would require positive rectification in the A.M. detector 60 with a negative bias applied at the terminal 74 while at the same time the response of the F.M. detector 92 is inverted in slope; the latter is accomplished simply by interchange in the F.M. detector of the output and ground points. Alternatively of course the two responses may have slopes of like sign in which case a subtractive rather than an additive arrangement would be required.

A necessary and sufficient condition for the solution of the simultaneous equations is that the determinant $k_1 k_4 - k_2 k_3$ be non-zero. By a rearrangement of the term this condition may be restated to be (3) $$\frac{k_1}{k_2} - \frac{k_3}{k_4} \neq 0$$

Recalling that the constants $k_1$, $k_2$, $k_3$ and $k_4$ are inherently positive, the minuend and also the subtrahend in Equation 3 are inherently positive as well. Recalling also that the ratio of sensitivity to moisture change to that of the fiber weight change of the amplitude modulation is so much greater than the corresponding ratio of sensitivities of frequency modulation change, it is clear that the expression in Equation 3 is not only non-zero but is inherently positive as well. Upon solution of the Equations 1 and 2 for moisture there is obtained (4) $$m = \frac{k_4 V_{AM} + k_2 V_{FM}}{k_2 k_4 \left[ \frac{k_1}{k_2} - \frac{k_3}{k_4} \right]}$$

The bracketed term in the denominator of Equation 4 is the left-hand side of Equation 3 and is therefore inherently positive, and since the constants $k_2$ and $k_4$ are also inherently positive, the voltages $V_{AM}$ and $V_{FM}$ may be combined additively provided they are suitably weighted by factors related in the ratio of $k_4:k_2$ respectively. To this end the terminal 69 is connected over line 96 and through two series connected resistors 98 and 100 to an input junction 102 of a D.C. summing amplifier 104, and the output terminal 94 is connected over line 106 and through the two series connected resistors 108 and 110 also to the input junction 102. R.F. bypass capacitors 112 and 114 are connected to ground from the junction of resistors 98 and 100 and from the junction of resistor 108 and 110 respectively. A feedback resistor 116 is connected from the output terminal of the amplifier 104 also to the input junction 102. The operation of the amplifier 104 is well-known; in the absence of negative feedback, that is with resistor 116 omitted, its gain from the input junction 102 to the output terminal 118 is very high. Moreover there is a reversal in phase from the junction 102 to the output terminal 118. The junction 118 is at ground potential so that with zero volts input at the input junction 102 the potential at the output junction 118 is also zero; if a positive potential is applied to junction 102 the potential of junction 118 drops below zero volts and vice versa. With the resistance 116 included, the output voltage $E_0$ at the terminal 118 may be represented as (5) $$E_0 = -R_0 \left[ \frac{V_{AM}}{R_4} + \frac{V_{FM}}{R_2} \right]$$

where $R_0$ is the resistance of the feedback resistor 116, $R_4$ is the sum of the resistance values of resistors 98 and 100, and $R_2$ is the sum of the resistance values of resistors 108 and 110. To satisfy the requirements of the proper weighting of the voltages $V_{AM}$ and $V_{FM}$ for proper computation of moisture it is merely necessary to proportion the resistors 98, 100 with relation to the resistors 108 and 110 such that $k_4 R_4 = k_2 R_2$. The various constants and resistors may be determined experimentally for the particular material required by measuring the voltages $V_{AM}$ and $V_{FM}$ with material of standard moisture but known non-standard fiber weight subject to measurement by condenser 16. Similarly the constants $k_1$ and $k_3$ may be determined experimentally for the particular grade and thickness of paper selected by measuring the voltages $V_{AM}$ and $V_{FM}$ with material of standard fiber weight but known non-standard moisture subjected to measurement by condenser 16.

A zero-center meter 120 is connected from the output terminal 118 to ground and reflects deviation from standard moisture; if it is desired to provide positive deflection for positive moisture deviation from standard it is necessary to ground the positive terminal of the indicator 120 and connect to the terminal 118 the negative terminal of the indicator 120; this is in view of the phase reversal of the amplifier 104. It should be understood that the indicator 120 is merely representative of a moisture measurement utilization device and may be replaced by or supplemented by means for controlling the moisture weight of the material 30. It is readily seen that the elements onward of lines 96 and 106 constitute a means 107 for solving the simultaneous Equations 1 and 2 for moisture deviation.

The deviation in fiber weight $f$ may be computed in a manner entirely analogous to the computation of the moisture weight by provision of a means 107' for solving the Equations 1 and 2 for the variable $f$. The lines 96 and 106 are also connected to the block 107' in which the parts corresponding respectively to those of the block 107 are labeled by like reference numerals followed by a prime. In fact the various corresponding parts are identical except for the selection of resistance values of the resistors 98', 100', 108' and 110' and the manner of connection of the indicator 120'. These differences will now be explained. From Equations 1 and 2 there is obtained for the value of the deviation in fiber weight $$(6) \qquad f = -\left[\frac{k_3 V_{AM} + k_1 V_{FM}}{k_2 k_4 \left[\frac{k_1}{k_2} - \frac{k_3}{k_4}\right]}\right]$$

Comparison of Equations 5 and 6 indicates for Equation 6 identical and therefore positive denominators, again multiplication of the voltage $V_{AM}$ by an inherently positive constant, herein $k_3$, and multiplication of the voltage $V_{FM}$ also by an inherently positive constant, herein $k_1$, so that the voltages $V_{AM}$ and $V_{FM}$, weighted by the constants $k_3$ and $k_1$ respectively, may be combined additively. It is to be noted however that the entire expression on the right hand side of Equation 6 is prefaced by a minus sign. These distinctions from Equation 5 are met as follows: Let the sum of the resistance values of the resistors 98' and 100' be $R_3$ and that of the resistors 108' and 110' be $R_1$. The weighting of the voltages $V_{AM}$ and $V_{FM}$ is satisfied by selecting $R_3$ and $R_1$ such that $k_3 R_3 = k_1 R_1$, and for complete consistency with the computation in the unit 107 $k_1 R_1 = k_2 R_2 = k_3 R_3 = k_4 R_4$. In order to effect positive deflection for the indicator 120' responsive to an increase in fiber weight above standard, in view of the minus sign prefacing the right hand side of Equation 6, the positive terminal of indicator 120 is connected to the output terminal 180' whereas its negative end is grounded. Again it should be understood that the output available at the terminal 118' may be utilized to control means governing the fiber weight of the paper strip 30.

The moisture voltage output available at the terminal 118 and the moisture output voltage available at the terminal 118' may ultimately be combined to reflect either total deviation from standard weight or total weight of the strip material 30. If this is to be done additively, recalling the inequality of the signs on the right hand side of the Equations 5 and 6, it is necessary to invert either the fiber weight or moisture weight output voltage in phase. In the apparatus illustrated in Fig. 1 this is done for the moisture weight output voltage available at the terminal 118. To this end the terminal 118 connects through a summing resistor 100" and to the input junction 102" of a similar D.C. amplifier 104" and as such constitutes the sole external input signal to the amplifier 104". In this case, to insure a unity gain the usual feedback resistor 116" which connects the corresponding terminals 102" and 118" of the amplifier 104" is selected to be of the same value as the resistor 100". Accordingly there is available at the output terminal 118" a moisture weight output voltage of the same magnitude as at the terminal 118 but of reversed phase; i.e. with an increase in moisture the potential at the terminal 118" will rise above ground potential and vice versa in the case of a decrease in moisture; the behaviour at the terminal 118" is analogous to that at the terminal 118' in the case of increase and decrease in fiber weight respectively.

The moisture weight output voltage at the terminal 118" is applied over line 122 through a summing resistor 100''' to a summing junction 102''' of a yet further similar summing amplifier 104''', whereas the terminal 118' is connected also to the junction 102''' through a summing resistor 110''', which is of the same magnitude as the resistor 100''', assuming as above that the amplifiers 104 and 104' are identical. The amplifier 104''' is provided with a corresponding output terminal 118''' from which a feedback resistor 116''' connects also to the junction 102'''. A similar zero-center indicator 120''' is connected from the terminal 118''' to ground; moreover owing to the phase reversal in the amplifier 104''' the negative terminal of the meter is connected to the terminal 118''' whereas its positive terminal is grounded, as shown. By reason of this connection, with an increase in moisture or in fiber weight the meter 120''' will deflect positively and conversely in the case of a decrease. In the case of a deviation in moisture accompanied with an equal and opposite deviation in fiber weight the indicator 120''' will not deflect at all as expected whereas the indicators 120 and 120' will deflect in the proper direction and in the proper amount as required.

If instead of total deviation from standard it is desired to measure total paper weight, the instrument 120''' is replaced by an ordinary meter deflecting from a minimum of zero to full scale and an additional resistor 124''' is connected from the summing junction 102''' to the B+ voltage. The resistor 124''' is selected in the following manner: Let the output voltage at the terminal 118''' responsive to a deviation in moisture of $m$ unit weights be $e_5$, let standard paper weight be $w$, let the resistance values of the resistors 100''' and 102''' be $R_5$ and resistor 124''' be $R_6$. $R_6$ is selected to satisfy the equality $e_5/mR_5 = B+/wR_6$.

It should be understood that this invention is not limited to specific details of construction and arrangement thereof herein illustrated, and that changes and modifications may occur to one skilled in the art without departing from the spirit of the invention. For example, a D.C. summing amplifier may be replaced by a quasi-D.C. summing amplifier, i.e. an A.C. amplifier provided with D.C. to A.C. conversion means (e.g. the well-known chopper) intermediate of its summing junction and its input side proper, and also provided with a well-known phase-sensitive rectifier intermediate of its output side proper and the feedback resistor. In such case the output indicator is fed by the phase-sensitive rectifier.

As a further modification example, in the interest of increasing the F.M. sensitivity (defined above) to both moisture and fiber weight the F.M. detector 92 is tuned to operate not in the radio frequency range of the oscillator 8—R.F. amplifier 88—limiter 90 chain, but in an intermediate frequency (I.F.) range. In such case detector 92 is of course not coupled directly to limiter 90, but as shown in Fig. 2 (via an output line 131 of limiter 90) through intervening well-known frequency conversion means 132. The frequency converter 132 feeds the detector 92 via line 133. The converter includes as a minimum simply (Fig. 3): a local oscillator 135 operating at a fixed difference frequency (the intermediate frequency) above or below the center frequency of the oscillator 8; and a heterodyne mixer 134 or converter coupled to the local oscillator 135. The converter 132 may receive its R.F. input from other blocks of Fig. 1 in the following order of preference: limiter 90, R.F. amplifier 88, oscillator 8, amplifier 4.

The heterodyne mixer generates a corresponding F.M. signal, but about the intermediate frequency, and such signal is fed to the detector 92. Such minimum circuitry will inherently produce or increase undesired A.M., necessitating a ratio detector. Since the conversion gain of the mixer is generally low, an I.F. amplifier 137 (Fig. 4) will generally be required intermediate of the mixer 134 and detector 92, and this is most preferably a limiter amplifier 138 similar to unit 90, whence the detector 92 may be of the preferred Foster-Seeley type. The term "limiter amplifier" is used to emphasize the fact that the limiters (90 or 138) limit and also amplify. They are of the conventional type of limiters used to drive Foster-Seeley discriminators which amplify and limit. The output signal of mixer 134 (Fig. 4) may be of sufficient magnitude so as to require no other amplification than that provided by the limiter 138. In such case the I.F. amplifier 137 may be dispensed with, and the output of the mixer 134 may be applied directly to the limiter 138. Circuitry suitable for the complete frequency conversion means is illustrated and described in chapters 25 and 26 of the aforesaid Langford-Smith text. The center or nominal operating frequency of oscillator 8 of course corresponds to standard paper.

For the further improvement of the F.M. sensitivity the circuitry described in the two preceding paragraphs is modified (Fig. 4) by insertion, intermediate of the heterodyne mixer and the limiter 90 (or the alternative units 88, 8 or 4 previously suggested), of a well-known harmonic generator 136 tuned to operate about a multiple of the center frequency of oscillator 8. The harmonic generator frequency deviation is multiplied accordingly. This of course necessitates corresponding increase by approximately the same multiple in the local oscillator frequency. If the I.F. is selected to be the same as in the preceding two paragraphs, the F.M. sensitivity may be increased by the same multiple.

As used herein "F.M." and "frequency modulation" shall comprehend phase modulation as well.

What is claimed is:

1. Apparatus for measuring the weight of continuously produced material composed of a plurality of ingredients from portion to portion thereof, comprising a variable amplitude, variable frequency oscillation system; electrical translating means disposed in proximity to said material, included in said system and effective to vary both the amplitude and frequency of the oscillation each jointly and severally in accordance with the two variables of weight of one of said ingredients and weight of the remaining ingredient; A.M. detector means and F.M. detector means connected to said system, respectively for amplitude and frequency demodulation of said oscillation, and providing a pair of demodulated similar signals representing a pair of simultaneous equations in said two variables; and means for combining said pair of similar signals in predetermined weighted relation to one another to produce a single signal representing the solution of said equations for one of the two variables.

2. Apparatus as specified in claim 1, wherein the detected A.M. and F.M. signals have opposite slopes, and wherein the equation solving means is a summing amplifier whose input is connected to the A.M. and F.M. detectors.

3. Apparatus as specified in claim 2 wherein the summing amplifier input is connected to the detectors through resistances weighted respectively in accordance with relative sensitivities of the amplitude and frequency modulations to the weight of the other variable.

4. Apparatus as specified in claim 1 further provided with a second means, similar to the aforesaid equation solving means, for deriving from the detected signals a second single signal representing the solution of the equations for the other variable.

5. Apparatus as specified in claim 4 further provided with means for combining the aforesaid two single signals to produce a resultant signal representative of the total material weight.

6. Apparatus as specified in claim 5 wherein the detected A.M. and F.M. signals have opposite slopes, wherein the two equation solving means are respectively first and second summing amplifiers each connected from its input to the detectors, and wherein the total material weight representative signal producing means is a third summing amplifier connected from its input to the output of said first summing amplifier, provided with a phase reversing amplifier connected intermediate of said second and third summing amplifiers.

7. Apparatus as specified in claim 6 wherein the first and second summing amplifiers are connected to the detectors respectively through a first and a second pair of resistances, the resistances in said first pair being weighted in accordance with the relative sensitivities of the amplitude and frequency modulations to the weight of the variable solved by said second summing amplifier, and vice versa for the resistances in said second pair.

8. Apparatus as specified in claim 1 further provided with means for linearizing the amplitude and frequency modulations.

9. Apparatus as specified in claim 8 wherein the translating means is connected in a tank circuit presenting simultaneously a reactance and a resistance each variable jointly in accordance with the two variables, characterized in that the linearizing means also includes a resistance and a reactance each connected in circuit with said translating element.

10. In apparatus for measuring the weight of continuously produced strip material composed of a plurality of ingredients from portion to portion thereof, the combination of a tuned R.F. amplifier, an electrical translation element connected in the tank circuit of said amplifier for simultaneously varying the amplification and ultimately the operating frequency of said amplifier each jointly in accordance with the two variables of weight of one of said ingredients and weight of the remaining ingredient or ingredients, thereby simultaneously amplitude and ultimately frequency modulating a signal applied to an input signal of said amplifier each jointly in accordance with said variables, a variable frequency oscillator, automatic frequency control means connected to said oscillator for locking in the operating frequency of said oscillator on the frequency to which said amplifier is tuned at any given instant thereby to produce an oscillator output signal containing said ultimate frequency modulation and also incidental amplitude modulation, limiter means receiving an input signal from said oscillator output for applying to said amplifier input a frequency modulated signal substantially free of said incidental amplitude modulation, A.M. detector means operatively connected to the amplifier and F.M. detector means operatively connected to said limiter means producing respective output signals representing a pair of simultaneous equations in the two variables, and means receiving said pair of signals for producing an output signal representing the solution of said equations for one of said variables.

11. Apparatus as specified in claim 1 with the inclusion in the F.M. detector means of a local oscillator operating at a frequency differing from the nominal operating frequency of the aforesaid oscillatory circuit system by a predetermined intermediate frequency, a heterodyne stage operatively connected to said local oscillator and said oscillatory circuit system for generating a frequency modulated signal in accordance with the frequency modulation of said oscillatory system but about said intermediate frequency, an intermediate frequency F.M. detector, and means for applying said heterodyne generated signal to the latter F.M. detector, said latter F.M. detector also operating about said difference intermediate frequency.

12. Apparatus as specified in claim 11 wherein the last-mentioned applying means includes an I.F. amplifier having at least one stage.

13. Apparatus as specified in claim 12 wherein at least the stage of the I.F. amplifier preceding the aforesaid latter F.M. detector is a limiter amplifier.

14. Apparatus as specified in claim 1 with the inclusion in the F.M. detector means of an harmonic generator coupled to the aforesaid oscillatory circuit system for producing an F.M. signal at a fixed multiple of the instant operating frequency of said circuit system, a local oscillator operating at a frequency differing from said multiple of the nominal operating frequency of said circuit system by a predetermined intermediate frequency, a heterodyne stage operatively connected to said local oscillator and harmonic generator for generating an F.M. signal in accordance with that of said harmonic generator but about said intermediate frequency, an intermediate frequency F.M. detector, and means for applying said heterodyne generated signal to the latter F.M. detector, said latter F.M. detector also operating about said intermediate frequency.

References Cited in the file of this patent

UNITED STATES PATENTS

| | | |
|---|---|---|
| 2,527,208 | Berry et al. | Oct. 24, 1950 |
| 2,533,871 | Blitz | Dec. 12, 1950 |
| 2,535,027 | Anderson | Dec. 26, 1950 |
| 2,768,629 | Maul | Oct. 30, 1956 |

FOREIGN PATENTS

| | | |
|---|---|---|
| 591,172 | Great Britain | Aug. 8, 1947 |